United States Patent
Sesto

(10) Patent No.: US 8,319,730 B2
(45) Date of Patent: Nov. 27, 2012

(54) PERIPHERAL POINTING DEVICES AND METHODS FOR MANUFACTURING THE SAME

(75) Inventor: Adrian Sesto, Hermosa Beach, CA (US)

(73) Assignee: Belkin International Inc., Playa Vista, CA (US)

( * ) Notice: Subject to any disclaimer, the term of this patent is extended or adjusted under 35 U.S.C. 154(b) by 976 days.

(21) Appl. No.: 12/360,685

(22) Filed: Jan. 27, 2009

(65) Prior Publication Data

US 2010/0191892 A1    Jul. 29, 2010

(51) Int. Cl.
*G06F 3/033* (2006.01)
*G09G 5/08* (2006.01)

(52) U.S. Cl. ........ 345/163; 345/156; 345/161; 345/164; 345/165; 345/166

(58) Field of Classification Search .................. 345/156, 345/157, 161, 163, 164, 165, 166, 184; 463/36, 463/37, 38, 39; 74/469, 471 R, 471 XY
See application file for complete search history.

(56) References Cited

U.S. PATENT DOCUMENTS

| | | | |
|---|---|---|---|
| 6,265,993 B1 * | 7/2001 | Johnson | 341/22 |
| 2002/0005834 A1 * | 1/2002 | Oh | 345/163 |
| 2006/0007151 A1 * | 1/2006 | Ram | 345/163 |
| 2007/0132733 A1 * | 6/2007 | Ram | 345/163 |
| 2007/0171201 A1 * | 7/2007 | Pi et al. | 345/157 |

* cited by examiner

*Primary Examiner* — My-Chau T Tran

(74) *Attorney, Agent, or Firm* — Bryan Cave LLP

(57) ABSTRACT

Embodiments of peripheral pointing devices and methods for manufacturing the same are generally described herein. In at least one embodiment, a peripheral device comprises a housing, one or more buttons at a first side of the housing, a displacement tracker at a second side of the housing, a keypad comprising keys at the second side of the housing; and a keypress restrictor coupled to the housing. Other examples, embodiments, and related methods are further described below.

22 Claims, 9 Drawing Sheets

… (1) …

PERIPHERAL POINTING DEVICES AND METHODS FOR MANUFACTURING THE SAME

TECHNICAL FIELD

This application relates generally to peripheral devices, and relates more particularly to peripheral pointing devices and methods for manufacturing the same.

BACKGROUND

Users often have to rely on peripheral devices in order to interface with an electronic device. With the present trend towards mobile computing, however, diminishing the amount of peripheral devices needed to interface with portable computers becomes important. The fewer peripheral devices a user has to carry around, the more flexibility the user will have to travel and work with less clutter.

Although portable computers, such as laptops and notebook computers, often include integrated pointing devices like touch pads, peripheral pointing devices are still preferred by users due to ergonomics and ease of use. One victim of the present trend towards mobile computing, however, has been the keyboard numeric pad. For example, although numeric pads are commonly found in stand-alone keyboards, portable computers such as laptop and/or notebook systems often do not include numeric pads with their integrated keyboards.

BRIEF DESCRIPTION OF THE DRAWINGS

The disclosure will be better understood from a reading of the following detailed description of examples of embodiments, taken in conjunction with the accompanying figures in the drawings in which.

Figure 1:
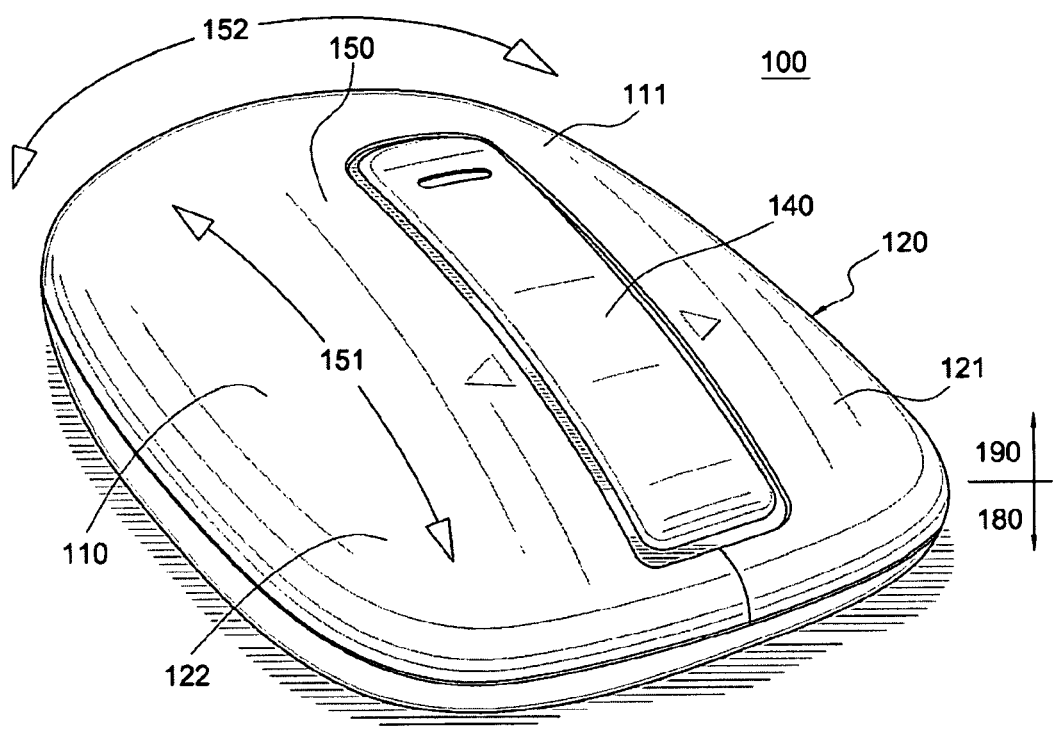
FIG. 1 illustrates a top perspective view of a peripheral device in accordance with a first embodiment.

For simplicity and clarity of illustration, the drawing figures illustrate the general manner of construction, and descriptions and details of well-known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the peripheral pointing devices and methods for manufacturing the same described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the peripheral pointing devices and methods for manufacturing the same described herein are, for example, capable of operation in other orientations than those illustrated or otherwise described herein.

The term "coupled," as used herein, is defined as directly or indirectly connected in an electrical, physical, mechanical, or other manner.

The terms "couple," "coupled," "couples," "coupling," and the like should be broadly understood and refer to connecting two or more elements, mechanically and/or otherwise, either directly or indirectly through intervening elements. Coupling may be for any length of time, e.g., permanent or semi-permanent or only for an instant.

The absence of the word "removably," "removable," and the like near the word "coupled," and the like does not mean that the coupling, etc. in question is or is not removable.

DETAILED DESCRIPTION

In at least one embodiment, a peripheral device comprises a housing, one or more buttons at a first side of the housing, a displacement tracker at a second side of the housing, a keypad comprising keys at the second side of the housing, and a keypress restrictor coupled to the housing. Other examples, embodiments, and related methods are further described below.

Figure 2:
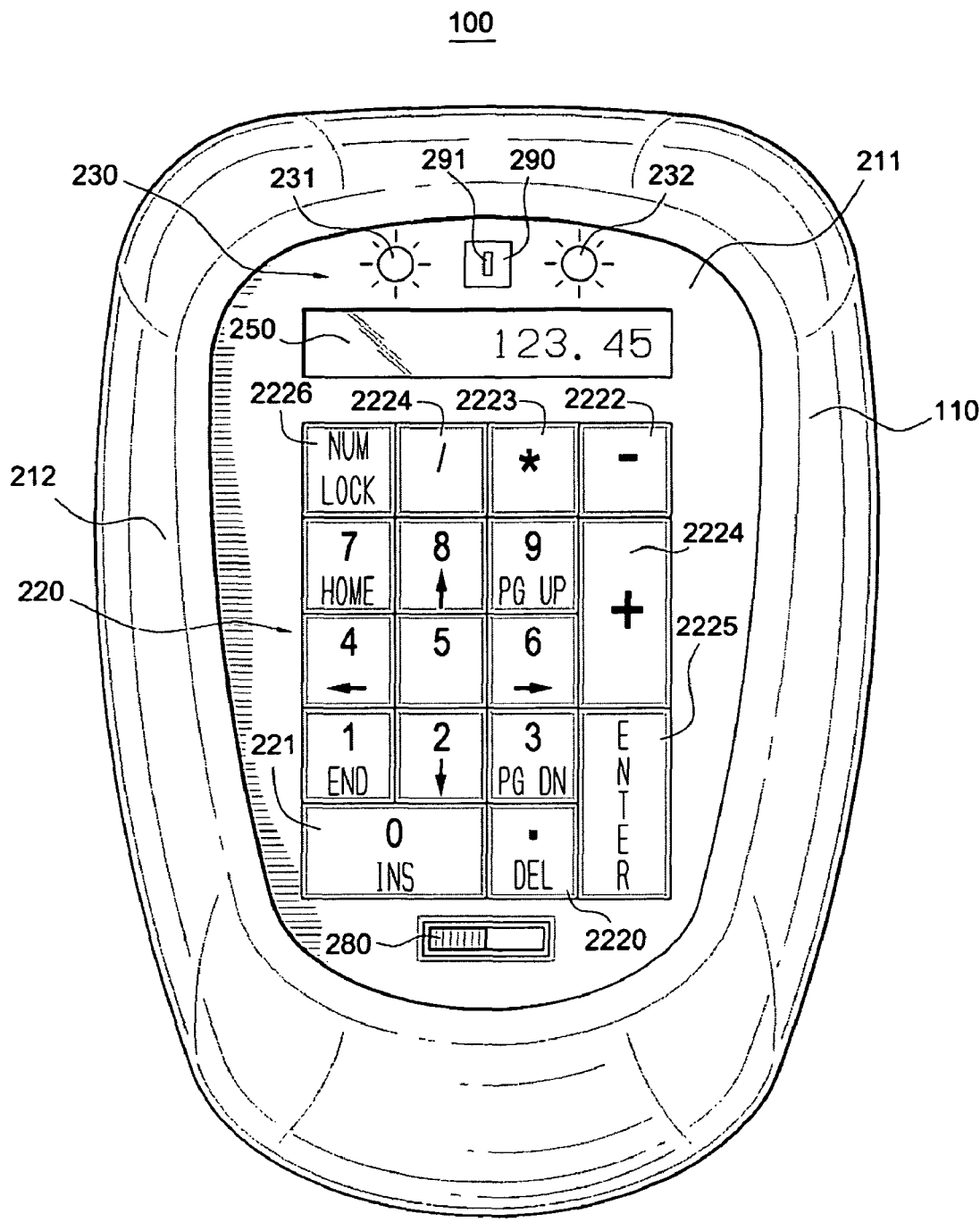
FIG. 2 illustrates a bottom view of the peripheral device of FIG. 1.

Turning to the drawings, FIG. 1 illustrates a top perspective view of a peripheral device 100. FIG. 2 illustrates a bottom side view of peripheral device 100. Peripheral device 100, as shown in the present example, comprises a mouse capable of being used to interface with and/or control electronic devices, such as personal computers, laptop computers, and/or notebook computers. As an example, peripheral device 100 can be used to control a pointer displayed on a computer display of a laptop computer, and to select menu items displayed by the screen when the pointer is positioned over a desired menu item.

In the present embodiment, peripheral device 100 comprises housing 110 with sides 111 and 211. Housing 110 is capable of housing components of peripheral device 100, and is configured in the present example to be handheld. The present example also illustrates button set 120, with button 121 and button 122 at side 111 of housing 110. Buttons 121-122 can, in the present and other examples, have functionality similar to that associated with left and right mouse buttons, respectively. In other examples, peripheral device 100 could comprise a different number of buttons 120. For example, button set 120 could comprise a single button, similar to the arrangement found in many peripheral devices geared for Apple® computers. In another example, button set 120 could comprise other types of buttons, such as buttons configured to control forward and/or backwards movement through webpages in an internet browser history, buttons configured as hotkeys to call specific applications such as an email client, internet browsers, a volume controller, and/or a calculator program.

Peripheral device 100 also comprises scroll pad 140 in the present embodiment. Scroll pad 140 can be similar to scroll wheels found in computer peripheral devices such as mice. In the present example, scroll pad 140 could be used to permit a user to scroll a screen on a display in several directions, such as up, down, left, and/or right, when the user displaces a finger upwards, downwards, and/or sideways over the touch pad. In some embodiments, scroll pad 140 could also serve as another button of button set 120, capable of performing an assigned function when pressed. Scroll pad 140 could alternatively comprise a scroll wheel in some embodiments.

Peripheral device 100 also comprises displacement tracker 290 (FIG. 2). In the present example, displacement tracker 290 comprises optical sensor 291 having a light-emitting diode (LED) and an image processing module. In other embodiments, displacement tracker 290 can comprise a laser sensor, which can be similar to optical sensor 291 but comprises a laser diode, instead, to allow for better resolution and/or to decrease power consumption. Displacement tracker 290 could, in other embodiments, be a mechanical sensor comprising, for example, a roller ball. In the present example, displacement tracker 290 is located at side 211 of housing 110. In other embodiments, however, such as in embodiments where displacement tracker comprises a trackball, displacement tracker could be located at side 111 of housing 110.

In the present embodiment, peripheral device 100 also comprises a wireless transceiver (not shown) within housing 110 and coupled to one or more of buttons 120 and/or to displacement tracker 290. The wireless transceiver can comprise a transmitter and a receiver, whether in a single module or in separate modules, within housing 110. In the present example, the wireless transceiver comprises a radio frequency (RF) transceiver, and can comply with an RF standard such as IEEE 802.11b or 802.11g. In another embodiment, the wireless transceiver can comprise a personal area network transceiver, such as those complying with a Bluetooth® standard. In some embodiments, peripheral device 100 can comprise a cellular phone, and the wireless transceiver could be a cellular transceiver. Other peripheral devices similar to peripheral device 100 can comprise cellular transceivers even if they do not comprise a cellular phone. There can also be embodiments without a wireless transceiver where the peripheral device communicates with an electronic device or computer via a wired connection, such as through a Universal Serial Bus (USB) connector.

As seen in FIG. 2, peripheral device 100 also comprises a controller or keypad 220 at side 211 of housing 110, where, side 211 is substantially opposite to side 111 in the present example. Keypad 220 comprises buttons or keys 221, arranged relative to each other similar to arrangements found in numeric keypads of computer keyboards. In the present example, keys 221 of keypad 220 comprise not only number keys zero through nine, but also keys for other functions such as key 2220 (period), key 2221 (addition), key 2222 (subtraction), 2223 (multiplication), 2224 (division), 2225 (Enter), and 2226 (Num Lock). Other examples of keypad 220 could comprise only a subset of keys 2210-2226, and/or other keys besides those of keys 221. In some embodiments, locating keypad 220 at side 211 can provide certain benefits over locating it at side 111. As an example, keypad 220 is out of the way in the present embodiment when a user slides side 211 over a surface while holding peripheral device 100 at side 111 with the palm of the hand, thereby preventing unwanted actuation of keys 221 by the palm or fingers of the user.

Figure 6:
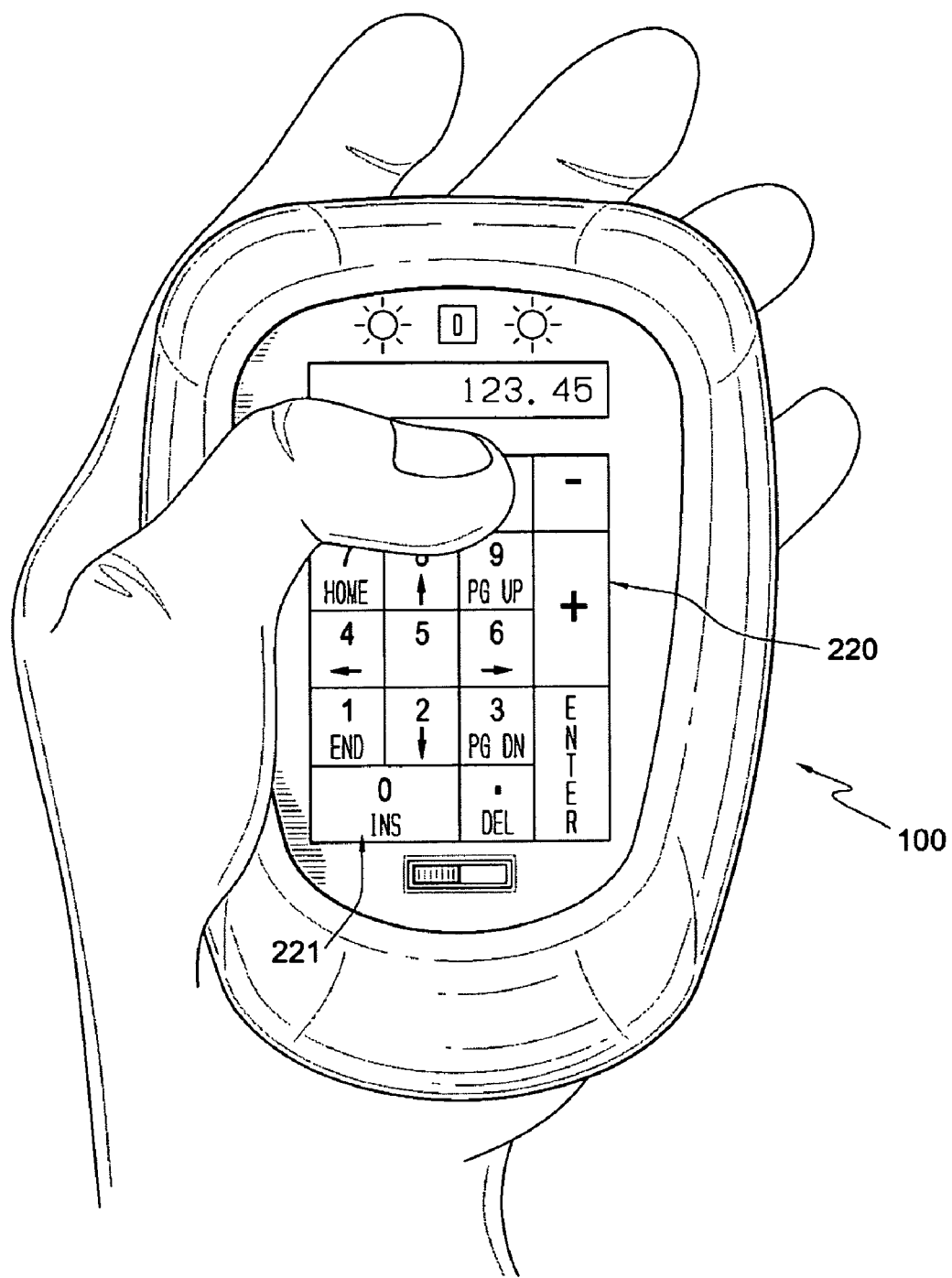
FIG. 6 illustrates a perspective view of the peripheral device of FIGS. 1 and 2 being handheld.

In the present example, keypad 220 has been reduced in size to fit at side 211 of housing 110. In the same or a different example, housing 110 and/or keys 221 can be arranged to permit keys 221 to be thumb-actionable, such that in a situation where the palm and/or the non-thumb fingers of a hand hold peripheral device 100 at side 111, the thumb(s) of the hand(s) can actuate buttons 221 of keypad 220 at side 211. Such an example can be appreciated in FIG. 6, illustrating a perspective view of peripheral device 100 being hand-held. In FIG. 6, keys 221 at side 211 are thumb-actuated by the thumb of a hand while the palm of the same hand holds side 111 (FIG. 1) of peripheral device 100. Some examples can comprise a housing configured to accommodate a keypad similar to keypad 220 but having keys with dimensions similar to those of keys in full-sized computer keyboards. Keypad 220 may, in some examples, comprise dimensions of approximately between 5 to 10 centimeters long and approximately between 4 to 8 centimeters wide. Some keys of keys 221 may also comprise a non-rectangular shape in some embodiments, such as to better conform to dimensions of side 211. In situations where keys 221 are thumb-actionable, locating keypad 220 at side 211 could provide further benefits. For example, a user holding peripheral device 100 with the palm of a hand at side 111 would be able to actuate keys 221 using the thumb of the hand without having to reposition the palm relative to peripheral device 100, and/or without having to relinquish his grip of peripheral device 100.

In the present embodiment, keypad 220 is recessed relative to side 211 of housing 110, such that a top surface of keys 221 does not protrude past or is located below keypress restrictor 212 at side 211 of housing 110. Keypress restrictor 212 comprises a surface of side 211 around a perimeter of keypad 220 in the present example. Because keys 221 do not protrude past keypress restrictor 212, peripheral device 100 can be slid with side 211 facing a flat surface, such as a desktop, without actuating keys 221.

Figure 7:
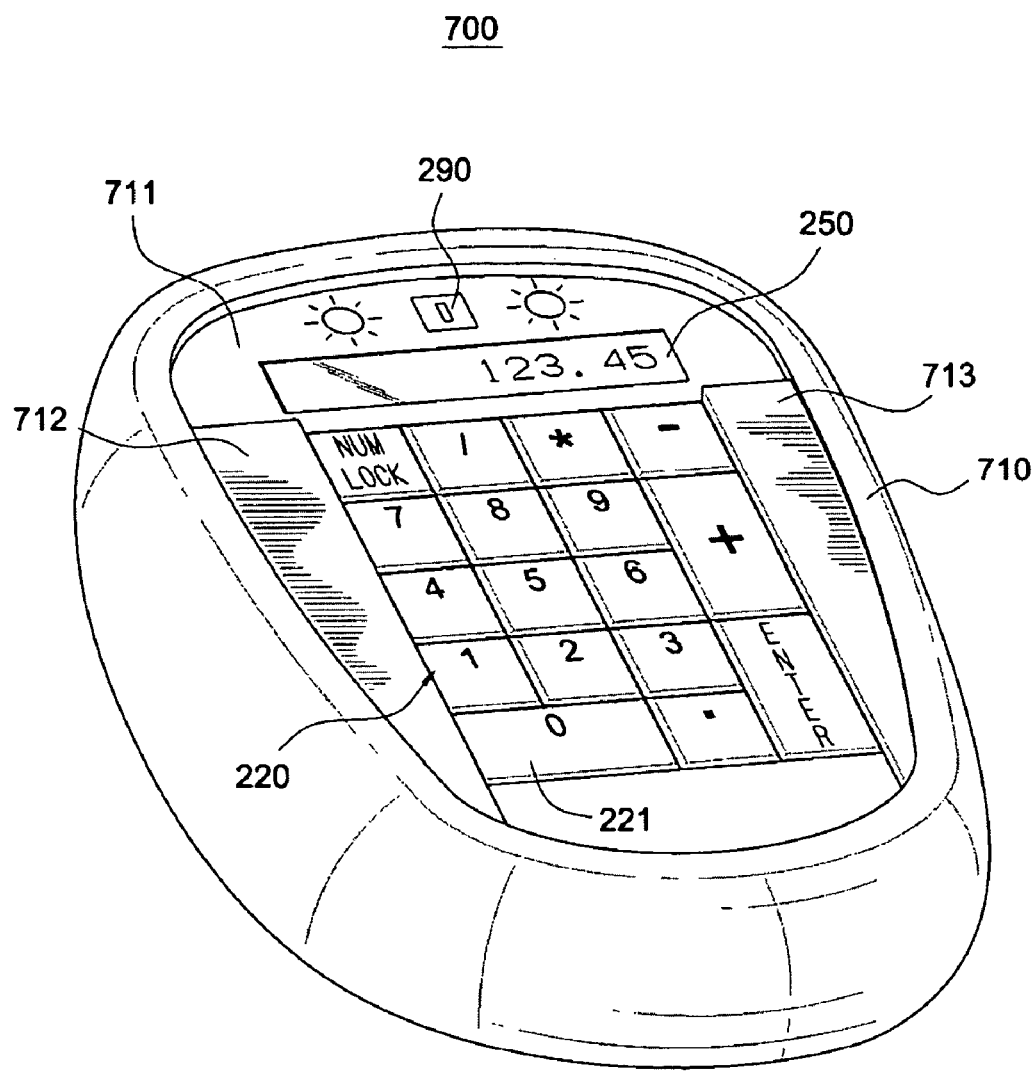
FIG. 7 illustrates a perspective view of a peripheral device in accordance with a fifth embodiment.

Other embodiments may comprise different types of keypress restrictors, whether in addition to, or in place of, keypress restrictor 212. For example, skipping ahead in the figures, FIG. 7 illustrates a perspective view of a peripheral device 700. Peripheral device 700 comprises housing 710 and side 711, similar to housing 110 and side 211, respectively, of peripheral device 100 (FIGS. 1-2). Side 711 differs from side 211, however, by having rails 712 and 713 coupled thereto, where rails 712 and 713 protrude past keys 221 of keypad 220. Rails 712 and 713 couple to side 711 at one or more portions of the perimeter of keypad 220, such that keys 221 could protrude past side 211 in the present example without being actuated when rails 712-713 are slid across a substantially flat surface.

Returning to FIG. 2, peripheral device 100 could have a keypress restrictor such as switch 280, which can be used in addition to or in place of keypad restrictor 212. Switch 280 is accessible at an exterior of housing 110 in the present example, and can permit a user to activate or deactivate keypad 220. In one embodiment, the activation of keypad 220 can also deactivate the mouse or other controller at the opposite side of the device, and the deactivation of keypad can re-activate the mouse or other controller.

In the same or a different example, a keypress restrictor could comprise a tilt sensor (not shown) similar to a mercury switch or a micromachined gyroscope, configured to enable keypad 220 when side 211 of peripheral device 100 substantially faces in one direction, such as direction 180 in FIG. 1, and to disable keypad 220 when side 211 of peripheral device 100 substantially faces in another direction, such as direction 190 in FIG. 1. In some examples, the tilt sensor could enable or disable keypad 220 automatically upon sensing a change in orientation of housing 110. Some embodiments may be configured such that button set 120 and displacement tracker 290 are activated when keypad 220 is deactivated, and/or vice-versa, such that button set 120 and displacement tracker 290 are deactivated when keypad 220 is activated.

Peripheral device 100 also comprises indicators 230. Indicators 230 are located at side 211 of housing 110 in the present embodiment, and can be configured to indicate the status one or more characteristics of peripheral device 100. As an example, indicator 231 is configured to indicate whether the "Num Lock" mode of keypad 220, controlled through key 2226, is enabled. In the same or a different embodiment, other indicators, such as indicator 232, could be configured to indicate other statuses, such as whether a switch-based keypress restrictor is actuated, whether a keypad such as keypad 220 is active, and/or a power or battery status of the peripheral device. Although in the present embodiment indicators 230 are lighted, there could be other embodiments with mechanical or non-lighted indicators. In addition, there can also be embodiments where some or all of indicators 230 are located at side 111 of housing 110.

In the present embodiment, peripheral device 100 also comprises display 250 at side 211 of housing 110, and a calculator module (not shown). The calculator module is located within housing 100 in the present example, coupled to at least one of display 250 or keypad 220. In the present example, the calculator module can be configured to permit peripheral device 100 to function as a stand-alone calculator, such as by interpreting input entered into keypad 220 to cause display 250 to display a corresponding output. In the some examples, the calculator module need not be coupled to keypad 220, and could control display 250 to display information corresponding to signals received from an electronic device or computer to which peripheral device 100 is coupled. In other embodiments, display 250 and the calculator module may be absent altogether.

Figure 3:
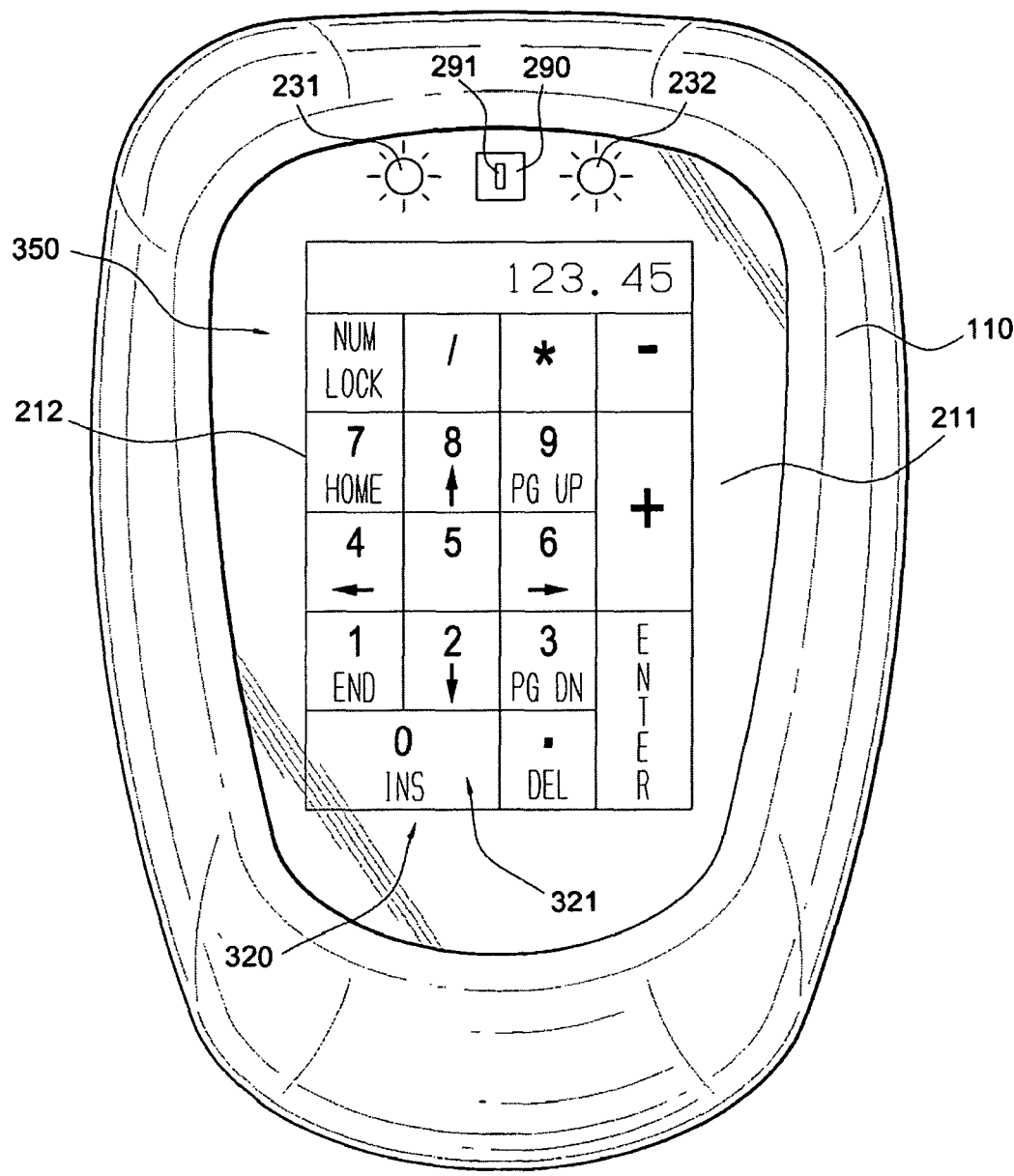
FIG. 3 illustrates a bottom view of a peripheral device in accordance with a second embodiment.
Figure 4:
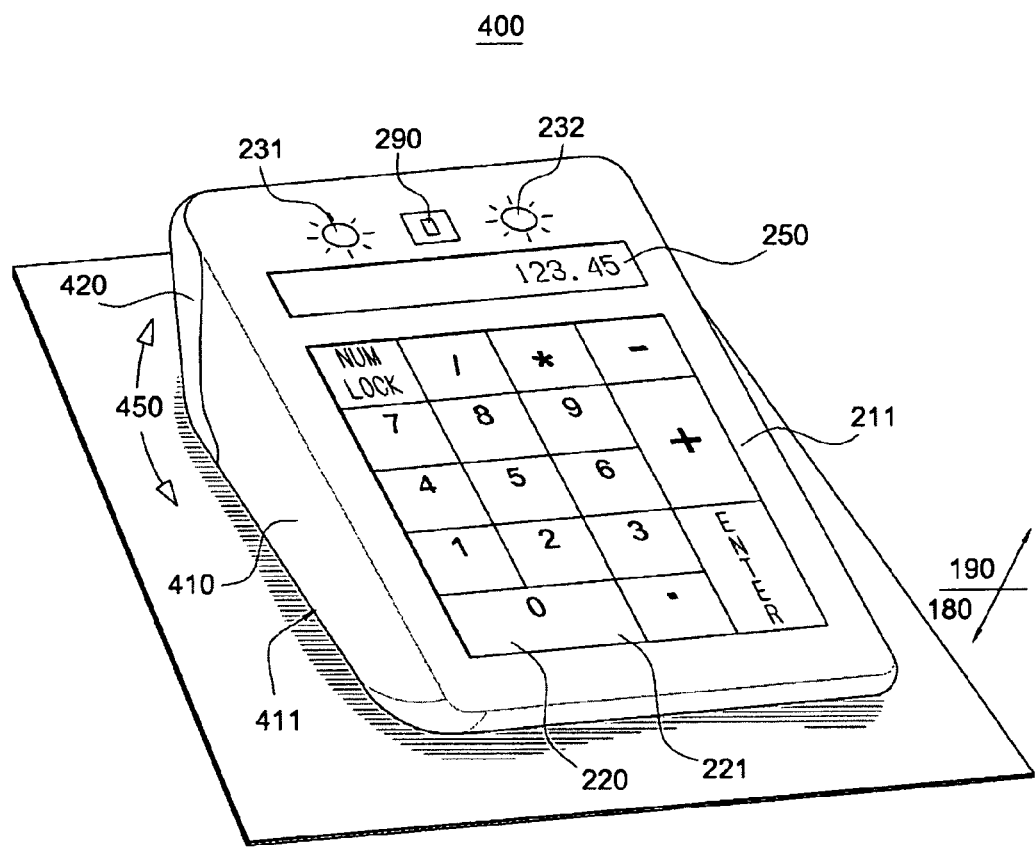
FIG. 4 illustrates a perspective view of a peripheral device in accordance with a third embodiment.

Continuing with the drawings, FIG. 3 illustrates a bottom side view of peripheral device 300. Peripheral device 300 can be similar to peripheral device 100 (FIGS. 1-2), but comprises display 350 instead of display 250, where display 350 comprises a touch-sensitive screen. In the present example, display 350 can serve substantially the same function as display 250, but is further capable of displaying buttons or keys 321 of controller or keypad 320. Keypad 320 is similar to keypad 220, (FIG. 2), but does not comprise physical keys. Instead, keys 321 of keypad 320 are displayed at the touch-sensitive screen of display 350. In the present embodiment, keys 321 are representations of keys 221 (FIG. 2), and can perform functions similar to corresponding ones of keys 221 when the touch-sensitive screen of display 350 is pressed proximate to specific ones of keys 321. In a different embodiment, display 350 can display screens different from keypad 320 and/or keys 321. For example, display 350 could also present a dialpad screen, displaying keys related to placing and ending telephone calls, in embodiments where peripheral device 350 comprises a cellular phone While some embodiments may comprise a substantially flat housing, housing 110 comprises an ergonomic shape 150 (FIG. 1) in the present example. As seen in FIG. 1, ergonomic shape 150 at side 111 comprises an arcuate configuration, with arcs 151 and 152 designed to conform to the palm of a hand. Other embodiments could comprise ergonomic shapes with respect to a user's eyesight, rather than only based on the ergonomics of the palm of a hand. For example, FIG. 4 illustrates a perspective view of a peripheral device 400 similar to peripheral device 100 (FIGS. 1-2). Peripheral device 400 comprises button set 420, and housing 410 with side 411, similar to button set 120 and side 111 of housing 110 (FIGS. 1-2). Housing 410 comprises ergonomic shape 450, which can be configured to elevate display 250 and keypad 220 at an ergonomic view angle with respect to a user's eyesight, such as to facilitate reading of display 250 and/or keypad 220 when peripheral device 400 is laid over a flat surface. In some embodiments, the ergonomic view angle can range between approximately 10 to 45 degrees. In the same or a different embodiment, ergonomic shape 450 can also be ergonomic with respect to the palm of a hand. In some embodiments, locating keypad 220 at side 211 can also he beneficial with respect to the ergonomic shape of the housing of the peripheral device. For example, the location of keypad 220 at side 211 permits keys 221 to be laid substantially flat, while permitting the configuration of ergonomic shape 150 (FIG. 1) at side 111 to conform to the palm of a hand.

Figure 5:
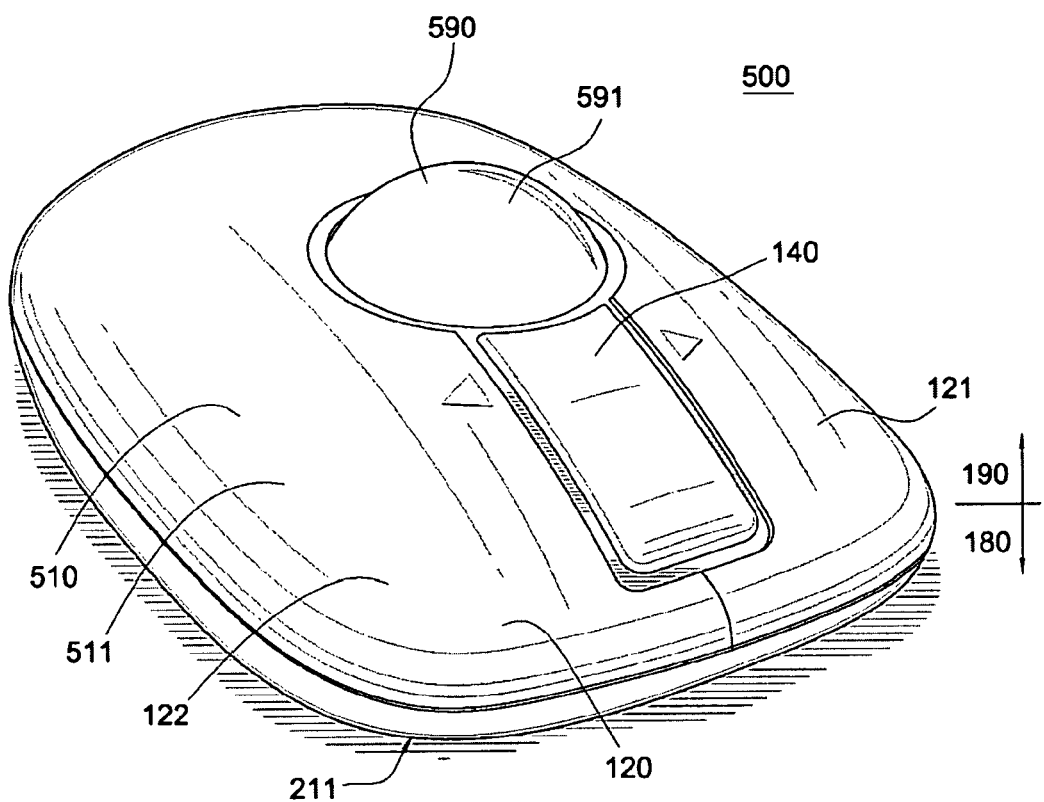
FIG. 5 illustrates a perspective view of a peripheral device in accordance with a fourth embodiment.

Continuing with the figures, FIG. 5 illustrates a perspective view of peripheral device 500, similar to peripheral device 100 of FIGS. 1-2. Peripheral device 500 differs from peripheral device 100 by comprising displacement tracker 590 on side 511 of housing 510. Displacement tracker 590 can be similar to displacement tracker 290 (FIGS. 2-4), but is instead located at side 511 and, in the present example, comprises trackball 591.

Figure 8:
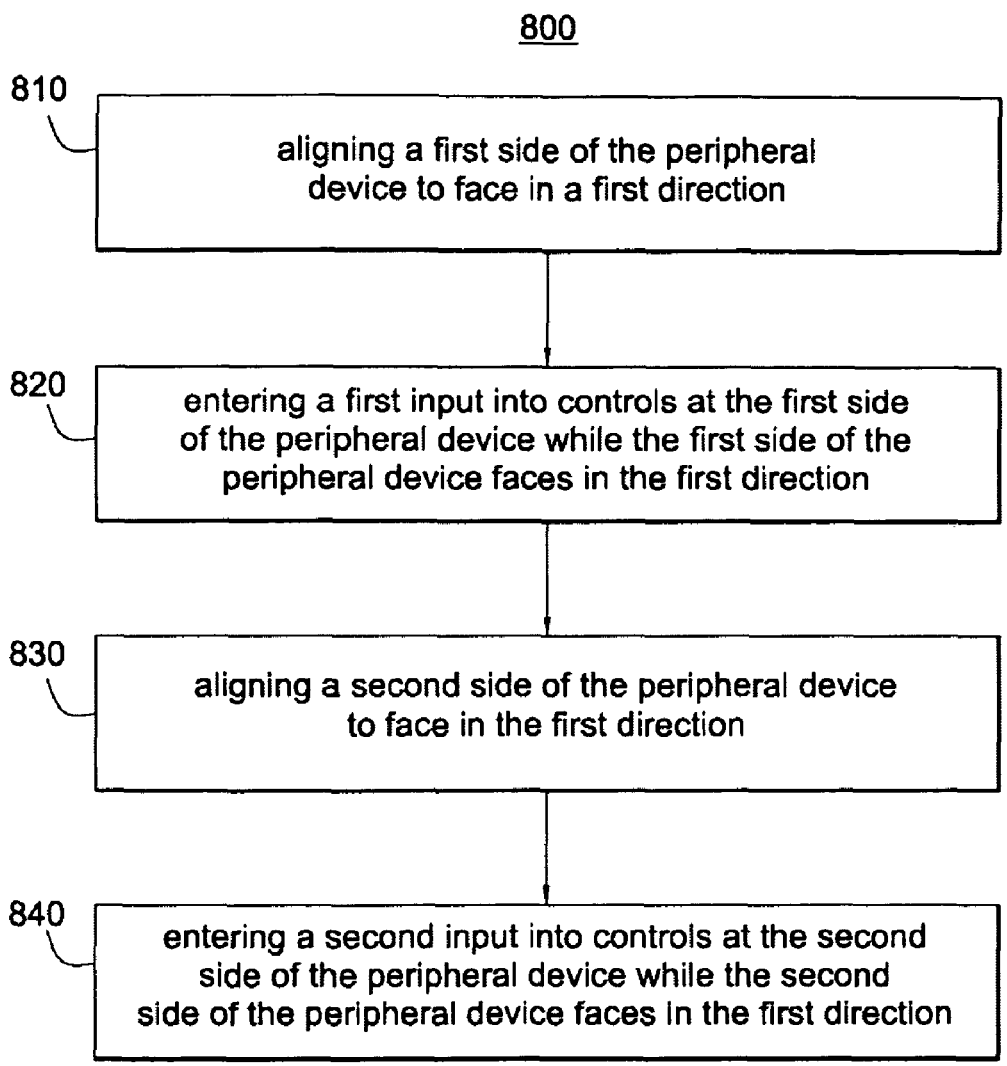
FIG. 8 illustrates a flowchart for a method of using a peripheral device.

Moving along, FIG. 8 illustrates a flowchart for a method 800 of using a peripheral device. In some examples, the peripheral device can be similar to one of peripheral devices 100 (FIGS. 1-2 and 6), 300 (FIG. 3), 400 (FIG. 4), 500 (FIG. 5), and/or 700 (FIG. 7).

Block 810 of method 800 comprises aligning a first side of the peripheral device to face in a first direction. In some examples, the first side can be similar to side 211 (FIGS. 2-6), and the first direction can be similar to direction 190 (FIGS. 1, 4 and 5). In the same or a different example, the first direction could be towards a user of the peripheral device, or opposite a surface over which the peripheral device lies.

Block 820 of method 800 comprises entering a first input into controls at the first side of the peripheral device while the first side of the peripheral device faces in the first direction. In some examples, the controls can be the keys or other controls of a controller or keypad such as one of keypads 220 (FIGS. 2, 4, 6, and 7), or 320 (FIG. 3). In the same or a different example, the controls can be thumb-actionable, and the first input can be entered into the controls as described above for FIG. 6.

Block 830 of method 800 comprises aligning a second side of the peripheral device to face in the first direction. In some examples, the second side can be similar to side 111 (FIG. 1), 411 (FIG. 4), or 511 (FIG. 5). In the same or a different example, the second side may be aligned in the first direction so that the first side may slide across a flat surface, as in the case where the peripheral device comprises a computer mouse.

Block 840 of method 800 comprises entering a second input into controls at the second side of the peripheral device while the second side of the peripheral device faces in the first direction. In some examples, the controls at the second side can comprise button sets 120 (FIGS. 1 and 5), 420 (FIG. 4) and/or scroll pad 140 (FIGS. 1 and 5).

Figure 9:
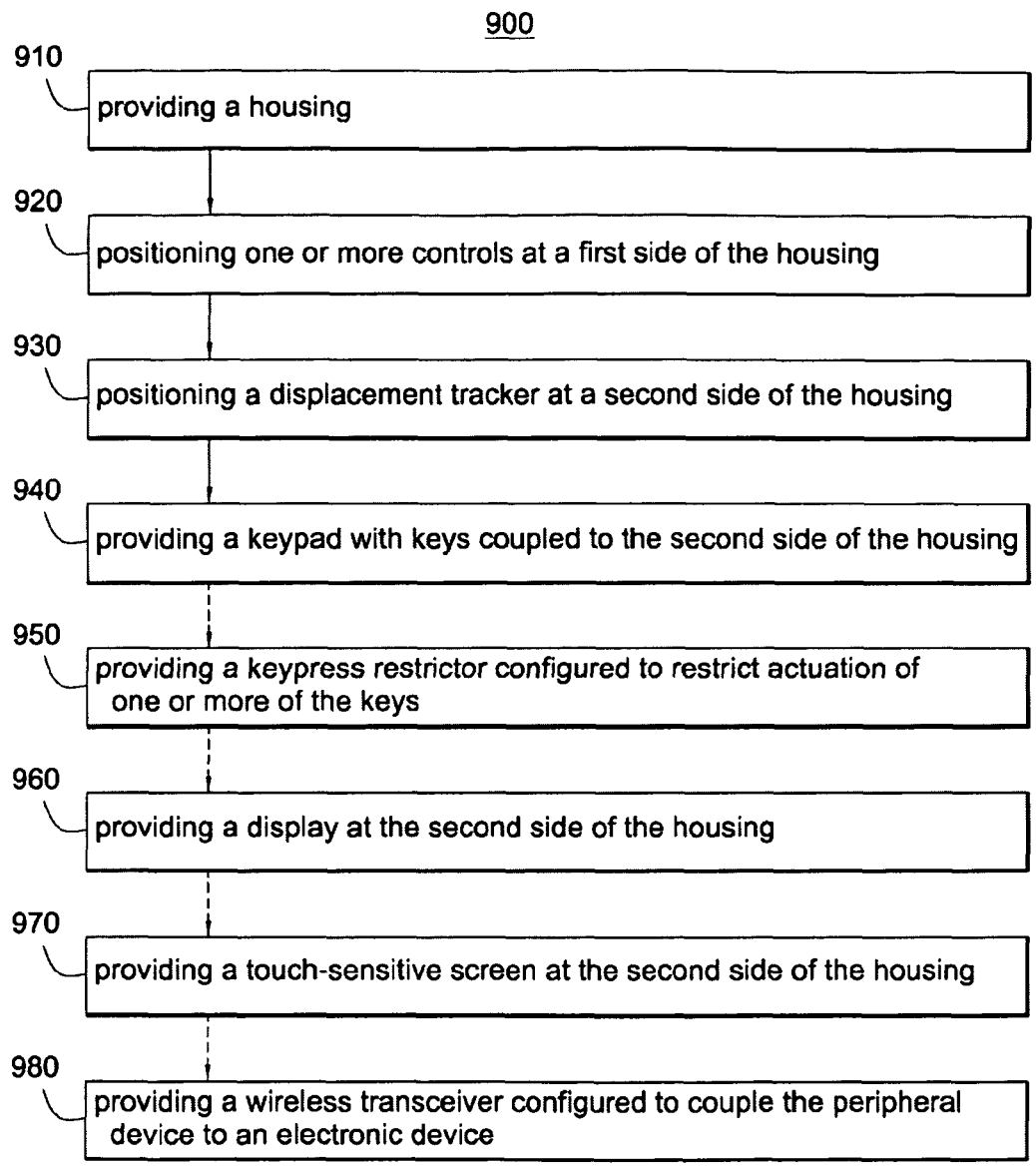
FIG. 9 illustrates a flowchart of a method for manufacturing a peripheral device.

Continuing with the figures, FIG. 9 illustrates a flowchart of a method 900 for manufacturing a peripheral device. In some examples, the peripheral device can be similar to one of peripheral devices 100 (FIGS. 1-2 and 6), 300 (FIG. 3), 400 (FIG. 4), 500 (FIG. 5), and/or 700 (FIG. 7).

Block 910 of method 900 comprises providing a housing, where the housing can be similar to one or more of housings 110 (FIGS. 1-3 and 6), 410 (FIG. 4), and 510 (FIG. 5), among others. The housing of method 800 comprises a first side and a second side, where the first side can be similar to sides 111 (FIG. 1), 411 (FIG. 4), or 511 (FIG. 5), and the second side can be similar to sides 211 (FIGS. 2, 3, 4, and 6) or 711 (FIG. 7). In some embodiments, the first side and the second sides are not opposite to each other.

Block 920 of method 900 comprises positioning one or more controls at a first side of the housing. In some embodiments, the controls can comprise at least one of a right button, a left button, or a scroll actuator. For example, the controls at the first side can be similar to button sets 120 (FIGS. 1 and 5), button sets 420 (FIG. 4), and/or scroll pad 140 (FIGS. 1 and 5) in some embodiments.

Block 930 of method 900 comprises positioning a displacement tracker at a second side of the housing. The displacement tracker can be similar to displacement tracker 290 (FIGS. 2-4) or 590 (FIG. 5), and can comprise an optical sensor, a laser sensor, a trackball, and/or a roller ball in some embodiments. In other examples, the displacement tracker could be positioned at the first side of the housing.

Block 940 of method 900 comprises providing a keypad with keys coupled to the second side of the housing, where the keypad and the keys can be similar to keypad 220 (FIGS. 2, 4, 6, and 7), or keypad 320 (FIG. 3) in some embodiments. In the same or different embodiments, the keys of the keypad can be aligned to be thumb-actionable when the peripheral device is handheld, as described above for FIG. 6 with respect to keypad 220.

In some examples, at least some of the different elements of blocks 910, 920, 930, and/or 940 can be coupled to each other through a processor module within the housing described for block 910. In the same or a different example, some of the different elements of the peripheral device of method 900 can couple directly with an external electronic device, such as a personal computer, capable of processing signals to and/or from the elements of the peripheral device. In some embodiments, the peripheral device of method 900 can comprise a processor module to couple to at least some of the different elements of the peripheral device and to communicate with an external electronic device.

Continuing with method 900, block 950 comprises providing a keypress restrictor configured to restrict actuation of one or more of the keys. In one example, the keypress restrictor can comprise a surface at the second side of the housing, such as described above with respect to surface 212 and keypad 220 in FIG. 2. In a different example, the keypress restrictor can comprise one or more rails configured to protrude past the keys of the keypad, such as described above with respect to keypad 220 and keypress restrictors 712-713 in FIG. 7. In the same or another example, the keypress restrictor can comprise a switch configured to control activation of the keypad, such as described above for switch 280 in FIG. 2. In the same or a different example, the keypress restrictor can comprise a tilt sensor configured to enable the keypad when the second side of the peripheral device faces a first direction, and to disable the keypad when the second side of the peripheral device faces a second direction. Such tilt sensor could function similar to a mercury switch and/or micromachined gyroscope within the housing of block 901, in some examples. Block 950 can be optional in some embodiments.

Method 900 can also optionally involve block 860 for providing a display at the second side of the housing, where the display can be similar to display 250 (FIG. 2) in some examples. In the same or a different example, block 960 can also comprise providing a calculator module coupled to the display and the keypad, where the calculator module can be configured to generate an output based on an input to the keypad, and the display can be configured to display the output from the calculator module.

In some examples, method 900 can also optionally comprise block 970, comprising providing a touch-sensitive screen at the second side of the housing, where the keys of the keypad are displayed on the touch-sensitive screen instead of comprised by individual mechanical keys. The touch-sensitive screen and/or the keys can be similar to touch-sensitive screen 350 and keys 321, respectively, as described above for FIG. 3.

Some examples of method 900 can also comprise block 980 for providing a wireless transceiver configured to couple the peripheral device to an electronic device. As an example, the wireless transceiver can be similar to the wireless transceiver described above for peripheral device 100. In other examples, the peripheral device of method 900 can instead communicate with an electronic device or computer via a wired connection, such as through a USB connector.

In some examples, one or more of the different blocks of method 800 (FIG. 8) and/or method 900 (FIG. 9) can be combined into a single step. For example, blocks 960-970 of method 900 can be combined into a single block, whereby the display of block 960 comprises the touch-sensitive screen of block 970. In the same or a different example, the sequence of one or more of the different blocks of methods 800 and/or 900 can be changed. As an example, blocks 830 and 840 of method 800 can be performed before blocks 810 and 820 in some implementations. In the same or a different example, methods 800 and/or 900 can comprise further or different steps. For example, method 800 can include an additional step, before block 820, comprising activating a control at the first side of the peripheral device. Similarly, an additional step comprising activating a control at the second side of the peripheral device can be carried out before block before block 840.

Although the peripheral pointing devices and methods for manufacturing the same have been described with reference to specific embodiments, it will be understood by those skilled in the art that various changes may be made without departing from the spirit or scope of the present disclosure. For example, it will be readily apparent that the peripheral pointing devices and methods for manufacturing the same described herein can be implemented for apparatuses that do not require displacement over a substantially flat surface in order to point. As an example, a peripheral device encompassed by the present disclosure could comprise a gyroscopic and/or three-dimensional displacement tracker or mechanism instead of, or in addition to, optical sensor 291 of displacement tracker 290 (FIGS. 2-4, and 6-7). Furthermore, the controller at the second side of the peripheral device can he a video game controller, instead of being merely a keypad. The video game controller can have buttons, joysticks, and the like, and/or can be implemented by using a touch screen. Additional examples of such changes have been given in the foregoing description. Accordingly, the disclosure of embodiments of the peripheral pointing devices and methods for manufacturing the same is intended to be illustrative of the scope of the application and is not intended to be limiting. It is intended that the scope of this application shall be limited only to the extent required by the appended claims.

For example, to one of ordinary skill in the art, it will be readily apparent that the peripheral pointing devices and methods for manufacturing the same discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the peripheral pointing devices and methods for manufacturing the same, and may disclose alternative embodiments of the peripheral pointing devices and methods for manufacturing the same.

All elements claimed in any particular claim are essential to the apparatus or method claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A peripheral device comprising:
   a housing;
   one or more buttons at a first side of the housing;
   a displacement tracker at the first side or a second side of the housing;
   a controller comprising buttons at the second side of the housing; and
   a controller restrictor coupled to the housing.

2. The peripheral device of claim 1, wherein:
   the first side of the housing is located substantially opposite to the second side of the housing.

3. The peripheral device of claim 1, wherein:
   the controller restrictor comprises at least one of:
      a surface at the second side of the housing;
      one or more rails configured to protrude past the buttons of the controller;
      a switch configured to set the controller to at least one of a deactivated mode or an active mode; or
      a tilt sensor configured to:
         enable the controller when the second side of the peripheral device substantially faces a first direction; and
         disable the controller when the second side of the peripheral device substantially faces a second direction.

4. The peripheral device of claim 1, wherein:
   the first side comprises an ergonomic shape with respect to the palm of a hand; and
   the second side is substantially flat.

5. The peripheral device of claim 1, wherein:
   the housing comprises an ergonomic shape configured to elevate the controller at an ergonomic view angle when the first side is laid over a flat surface.

6. The peripheral device of claim 1, wherein:
   the displacement tracker comprises at least one of:
      a trackball;
      a roller ball;
      an optical sensor; or
      a laser sensor.

7. The peripheral device of claim 1, further comprising:
   a display at the second side of the housing; and
   a calculator module coupled to at least one of the display or the controller;
   wherein:
      the calculator module is configured to generate an output based on an input to the controller; and
      the display is configured to display the output from the calculator module.

8. The peripheral device of claim 1, wherein:
   an outermost surface of the buttons of the controller is recessed relative to a surface of the second side of the housing.

9. The peripheral device of claim 1, further comprising:
   a wireless transceiver within the housing and coupled to the one or more buttons and the displacement tracker;
   wherein the wireless transceiver comprises at least one of:
      a cellular transceiver;
      a personal area network transceiver; or
      a radio frequency transceiver.

10. The peripheral device of claim 1, wherein:
    the buttons of the controller are aligned to be thumb-actionable when the peripheral device is handheld.

11. The peripheral device of claim 1, wherein:
    the controller comprises a touch-sensitive screen; and
    the buttons are displayed at the touch-sensitive screen.

12. The peripheral device of claim 1, further comprising at least one of:
    a scroll pad at the first side of the housing; or
    one or more lighted indicators at the second side of the housing.

13. A method for manufacturing a peripheral device, the method comprising:
    providing a housing;
    positioning one or more controls at a first side of the housing;
    positioning a displacement tracker at the first side or a second side of the housing;
    providing a controller with buttons coupled to the second side of the housing; and
    providing a controller restricted configured to restrict actuation of one or more of the buttons:
    wherein:
       the one or more controls comprise at least one of:
          a right button;
          a left button; or
          a scroll actuator;
       the controller restrictor comprises at least one of:
          a surface at the second side of the housing;
          one or more rails configured to protrude past the buttons of the controller;
          a switch configured to control activation of the controller; or
          a tilt sensor configured to:
             enable the controller when the second side of the peripheral device faces a first direction; and
             disable the controller when the second side of the peripheral device faces a second direction.

14. The method of claim 13, wherein:
    the first side is located substantially opposite to the second side.

15. The method of claim 13, further comprising:
    providing a display at the second side of the housing; and
    providing a calculator module coupled to the display and the controller;

wherein:
   the calculator module is configured to generate an output based on an input to the controller; and
   the display is configured to display the output from the calculator module.

16. The method of claim 13, further comprising:
providing a wireless transceiver configured to couple the peripheral device to an electronic device.

17. The method of claim 13, wherein:
providing the controller comprises aligning the buttons to be thumb-actionable when the peripheral device is handheld.

18. The method of claim 13, further comprising:
providing a touch-sensitive screen at the second side of the housing;
wherein providing the controller comprises displaying the buttons at the touch-sensitive screen.

19. A mouse comprising:
a housing;
a left mouse button and a right mouse button located at a first side of the housing;
a displacement tracker coupled to the housing;
a numeric keypad comprising keys at a second side of the housing;
a keypress restrictor; and
a wireless transceiver configured to wirelessly communicate the mouse;
wherein:
   the keypress restrictor comprises at least one of:
      a surface at the second side of the housing;
      one or more rails at the second side of the housing and configured to protrude past the keys of the numeric keypad;
      a switch configured to control activation of the numeric keypad; or
      a tilt sensor configured to:
         activate the numeric keypad when the second side of the mouse faces a first direction; and
         deactivate the numeric keypad when the second side of the mouse faces a second direction;
   the displacement tracker comprises at least one of:
      a trackball;
      a roller ball;
      an optical sensor; or
      a laser sensor;
   the wireless transceiver comprises at least one of:
      a cellular transceiver;
      a personal area network transceiver; or
      a radio frequency transceiver; and
   the keys of the numeric keypad are aligned to be thumb-actionable when the mouse is handheld.

20. The mouse of claim 19, further comprising:
a display at the second side of the housing; and
a calculator module coupled to the display and the numeric keypad;
wherein:
   the calculator module is configured to generate an output based on an input to the numeric keypad; and
   the display is configured to display the output from the calculator module.

21. The mouse of claim 19, wherein:
the numeric keypad comprises a touch-sensitive screen; and
the keys are displayed at the touch-sensitive screen.

22. The mouse of claim 19, wherein:
the left and right mouse buttons and the displacement tracker are activated when the numeric keypad is deactivated; and
the left and right mouse buttons and the displacement tracker are deactivated when the numeric keypad is activated.

* * * * *